United States Patent [19]

Greczin

[11] 4,142,352
[45] Mar. 6, 1979

[54] MULTI-WRAP HOSE REINFORCEMENT

[76] Inventor: John Greczin, 7312 School La., Philadelphia, Pa. 19126

[21] Appl. No.: 820,691

[22] Filed: Aug. 1, 1977

Related U.S. Application Data

[63] Continuation of Ser. No. 665,254, Mar. 9, 1976, abandoned.

[51] Int. Cl.² .............................................. D02G 3/38
[52] U.S. Cl. .......................................... 57/15; 57/10; 57/13
[58] Field of Search .................... 57/3, 10, 13, 15, 24, 57/160

[56] References Cited

U.S. PATENT DOCUMENTS

| | | | |
|---|---|---|---|
| 1,956,730 | 5/1934 | Reichelt | 57/160 |
| 2,098,922 | 11/1937 | McKnight | 57/15 X |
| 2,802,328 | 8/1957 | Ritchie | 57/13 |
| 3,201,930 | 8/1965 | Stirling | 57/15 X |
| 3,777,464 | 12/1973 | Gross | 57/24 |
| 3,861,128 | 1/1975 | Whitaker | 57/24 |

*Primary Examiner*—Charles Gorenstein
*Attorney, Agent, or Firm*—Weiser, Stapler & Spivak

[57] ABSTRACT

An apparatus for applying in continuous manner about a flexible hose a plurality of reinforcing wraps. The apparatus comprises generally a first yarn treating head including a first bobbin table and a second yarn treating head including a second bobbin table. The first and second bobbin tables rotate in opposite directions. Each bobbin table has mounted thereon a plurality of yarn carrying bobbins on each side of the table, for example, four bobbins per side. The apparatus can then accommodate a total of 16 bobbins, eight of which are located at each head, to wind reinforcing wraps of any desired number of yarns from two to 16 by utilizing all or only some of the bobbins.

9 Claims, 7 Drawing Figures

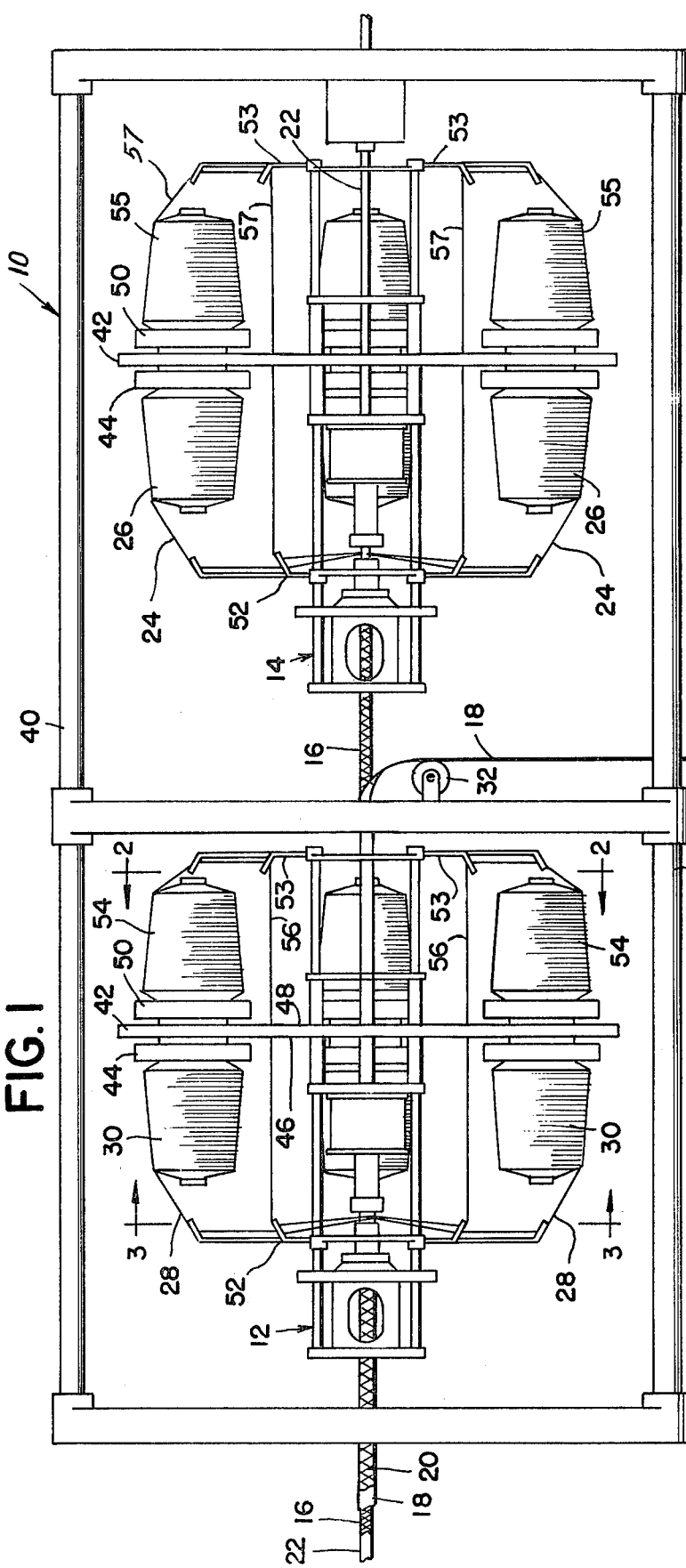
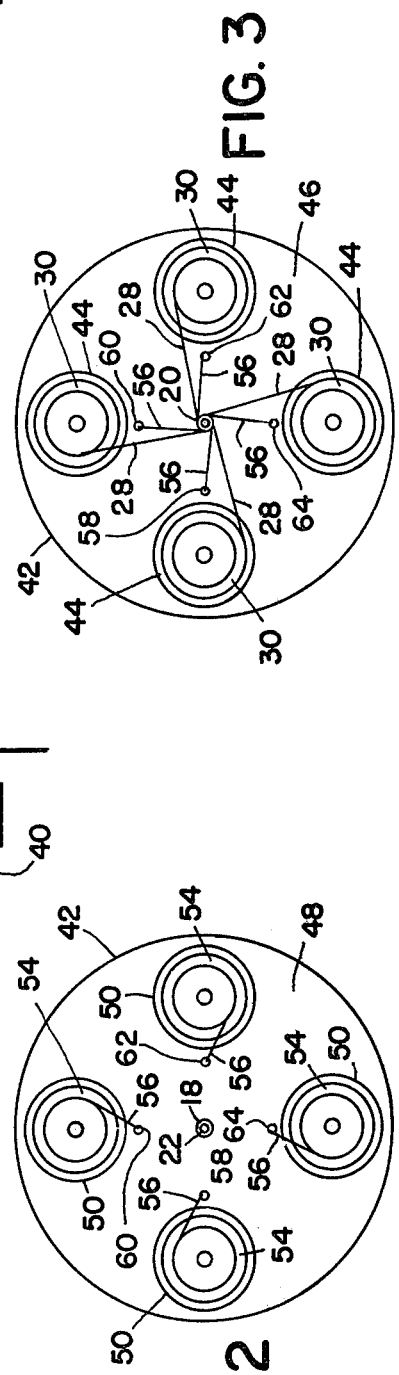

MULTI-WRAP HOSE REINFORCEMENT

This is a continuation, of application Ser. No. 665,254 filed Mar. 9, 1976, now abandoned.

BACKGROUND OF THE INVENTION

The present invention relates generally to the field of hose reinforcement and more particularly, relates to an apparatus for applying multiple reinforcing wraps to a flexible hose construction.

Flexible hose for conducting fluids under high pressures with little or no increase in length or volume of the hose have found wide application in industry. Prior workers in the art have developed reinforced hose having layers of wound yarn, metallic ribbons or other fibers or fabrics which have usually been applied as superimposed layers over a flexible hose core. Most often, resilient materials such as rubber sheeting or a thermoplastic sheet have been applied intermediate the various reinforcing wraps. U.S. Pat. Nos. 790,906 834,074, 1,010,088, 1,726,957, 2,047,770, 3,212,528, 3,357,456, 3,504,461, 3,729,028 and 3,866,633 show various types of hose reinforcement of the multi-layer type. These prior art reinforced hoses have generally proved satisfactory when in use, but have usually proved so complicated in construction as to render the cost thereof unusually high when considering the cost of the materials and the nature of the final product produced.

Some of the prior art patents above cited and U.S. Pat. No. 3,586,558, of which I am also aware teach methods of continuously manufacturing reinforced hose of the general type produced by the present invention. U.S. Pat. No. 3,586,558 discloses the use of a plurality of reinforcement applying machines in juxtaposed relationship, each of which carries a plurality of spools on which are wound yarns of which the reinforcement is continuously formed. The use of multiple knitting heads is also shown in my pending application Ser. No. 496,865, filed Aug. 12, 1974, entitled "Reinforced Hose," which discloses a machine capable of producing a multi-layer reinforcing upon a flexible hose.

All of the prior art machines, including my own, of which I am familiar, mount the yarn carrying bobbins on one side of the bobbin table only to thereby definitely limit the number of yarns that can be wound by a single machine. When additional yarn wraps have previously been required, the bobbin tables had to be constructed of larger diameter to accommodate the desired number of bobbins. This increased bobbin table diameter resulted in larger machines, larger power requirements to operate the machines, all of which combined to greatly increase the initial capital cost of the machinery.

SUMMARY OF THE INVENTION

The present invention relates generally to apparatus for producing multi-wrap, reinforced hose, and more particularly, is directed to apparatus including a plurality of bobbin tables in juxtaposed relationship wherein the tables include means to mount yarn carrying bobbins on both sides of each table.

The apparatus of the present invention comprises a plurality of bobbin tables, for example, two or more tables in juxtaposed relationship which concentrically receive therethrough a flexible hose for yarn reinforcement wrapping. The tables rotate in opposite directions and each table applies a plurality of reinforcing yarns which may be spirally wound about a flexible hose core.

In a preferred embodiment, each bobbin table includes means to mount yarn carrying spools on each side of the table to thereby accommodate a plurality of bobbins in an area much smaller than heretofore possible. By mounting yarn carrying spools on both sides of the bobbin tables, the bobbin tables can be smaller in diameter and the entire machine itself can be smaller. Hose reinforcing machines of the present design thereby can be produced at considerably less cost and will require less power for operation than comparable prior art devices.

It is therefore an object of the present invention to provide an improved apparatus for multi-wrap hose reinforcement of the type set forth.

It is another object of the present invention to provide a novel apparatus for multi-wrap hose reinforcement comprising a bobbin table having yarn carrying spools mounted on both sides and including means to apply the yarns about a flexible hose construction.

It is another object of the present invention to provide a novel apparatus for multi-wrap hose reinforcement including a plurality of bobbin tables rotating in opposite directions wherein each table includes means to mount yarn carrying spools on both sides of the table for applying a plurality of yarns to a hose in a plurality of reinforcing wraps.

It is another object of the present invention to provide a novel apparatus for continuous multi-wrap hose reinforcement incorporating a plurality of bobbin tables, each of which has a plurality of yarn carrying spools mounted on each side of the table and further including means to easily vary the number of yarns to be applied to a flexible hose as it is passed through the apparatus.

It is another object of the present invention to provide a novel apparatus for multi-wrap hose reinforcement incorporating a first yarn treating head having a bobbin table with spools mounted on each side of the table, a second yarn treating head having a bobbin table with spools mounted on each side of the table and means to apply all spool yarns to a flexible hose at one side of each table.

It is another object of the present invention to provide a novel apparatus for multi-wrap hose reinforcement that is simple in design, inexpensive in manufacture and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a partial side elevational view of the yarn applying apparatus of the present invention.

FIG. 2 is an enlarged, cross-sectional view taken along line 2—2 of FIG. 1, looking in the direction of the arrows.

FIG. 3 is an enlarged, cross-sectional view taken along line 3—3 of FIG. 1, looking in the direction of the arrows.

DESCRIPTION OF THE PREFERRED EMBODIMENT OF THE INVENTION

Figure 4:
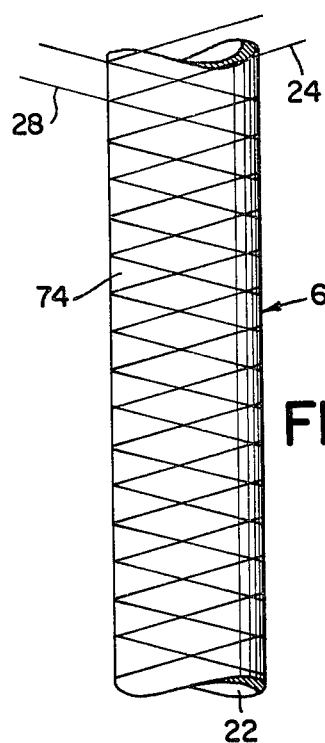
FIG. 4 is an enlarged, elevational view of a portion of a hose produced by the apparatus of FIG. 1 and having two layers comprising two yarns each.

Although specific terms are used in the following description for the sake of clarity, these terms are intended to refer only to the particular structure of my invention selected for illustration in the drawings, and are not intended to define or limit the scope of the invention.

Referring now to the drawings, there is shown in FIG. 1 a portion of a hose reinforcement machine 10 comprising a plurality of yarn treating heads 12, 14 of the type suitable to simultaneously spiral a plurality of yarn reinforcement wraps or layers 16, 20. Conventionally, a hose 22 of rubber, vinyl or other suitable flexible material is fed concentrically through the hose reinforcement machine 10 wherein the plurality of layers or wraps, 16, 20 are spiralled over the hose in continuous manner as the hose is fed through the machine 10. A rubber or vinyl sheet material layer 18 is fed over and wrapped about the first or inner reinforcement layer 16 intermediate the first and second yarn treating heads 12, 14 in a manner to completely cover the inner yarn reinforcment layer 16 and to insulate the inner layer 16 from the outer or second spiral reinforcement layer 20.

The machine 10 includes a stationary frame 40 which is illustrated in generally horizontal orientation. However, it should be noted that machine may also be vertically oriented or otherwise and still fall within the meaning and scope of this invention inasmuch as it is the function of wrapping or spiralling the reinforcement layers 16, 20 of the first and second yarn treating heads 12, 14 that is important rather than the direction of flow of the material itself. Each of the first and second yarn treating heads 12, 14 is similar in construction and includes generally a circular bobbin table 42 which is rotatable within the frame 40 in conventional manner. Preferably, one of the bobbin tables 42 rotates in a clockwise direction and the other table 42 rotates in a counterclockwise direction to balance the final product which is produced by the machine 10. Inasmuch as machines of the general type set forth have been well known for many years, for example, as disclosed in U.S. Pat. No. 2,752,962, the machine need not be further described in detail.

In the embodiment illustrated, each bobbin table 42 carries a plurality of left bobbin mounting means 44 which are secured to one side of the bobbin table 42, for example, the left side 46. The other side of each bobbin table 42, namely the right side 48, is similarly equipped with a plurality of right bobbin mounting means 50. As best seen in FIGS. 2 and 3, four or more bobbin mounting means 44 may be conveniently mounted upon the left side 46 of the bobbin tables 42 and the right side 48 of the bobbin mounting tables 42 may be similarly equipped with at least four other bobbins mounting means 50. Preferably, the left bobbin mounting means 44 and the right bobbin mounting means 50 are mounted in registry to achieve dynamic balance. However, it will be appreciated that other arrangements are possible. For example, the right bobbin mounting means 50 could be secured to the bobbin table 42 in positions closer to the table center than the left bobbin mounting means 44 and vice versa.

A plurality of yarn carrying spools 30, 26 conventionally are carried upon the left bobbin mounting means 44 and the spools 30, 26 rotate as the table 42 is rotated. Yarn 28 from each spool 30 feeds through a suitable yarn guide 52 for winding or wrapping about the hose 22. Yarn 56 feeds to the right yarn guide 53, through the table openings 58, 60, 62, 64 to the left yarn guide 52. The yarns 56, 28 cooperate to form the second yarn wrap 20.

Yarn 24 from each spool 26 at the right head 14 similarly feeds through a yarn guide 52 for winding or wrapping a first yarn wrap 16 about the hose 22 in conjunction with the yarn 57 from the spools 55 which feed from the right yarn guide 53.

Referring now to FIGS. 1, 2 and 3, it will be seen that a plurality of similar yarn carrying spools 54, 55 mount upon the right bobbin mounting means 50 in conventional manner for rotation when each bobbin table 42 is rotated. The right yarns 56, 57 feed from each spool 54, 55 to the right yarn guide 53 and then through respective bobbin table openings 58, 60, 62, 64 to the left yarn guide 52. The yarns 56, 57 then feed concentrically to spiral wrap the hose 22 about the hose 22 in conventional manner. The right and left yarns 56, 57 and 24, 28 are suitably treated by the yarn treatment heads 12 or 14 to cooperate to form a reinforcing wrap 16 or 20.

The treating heads 12, 14 are identical in construction and in operation with the exception that one head rotates in a clockwise direction and the other head rotates in a counterclockwise direction. Accordingly, all of the structure described for the head 12 is equally applicable for the head 14. It will be appreciated that although two yarn treating heads 12, 14 are illustrated, additional, similar heads could be employed to produce additional wraps about the hose 22 and still come within the meaning and scope of this invention.

As illustrated in FIG. 1, a strip wrapping station 32 is positioned intermediate the yarn treating heads 12, 14 and is employed in conventional manner to apply a strip of resilient material 18, which may be rubber or vinyl, over the first spiral layer 16 which is applied at the right yarn treating head 14. It should be noted that the rubber or vinyl strip 18 is not spiralled but is applied in a longitudinal manner to completely cover the inner yarn wrap or first spiral layer 16. The strip 18 is applied over the first yarn reinforcement layer 16 in a manner whereby the longitudinal edges are drawn together to apply the strip 18 completely about the hose whereby the longitudinal edges abut to form a longitudinally extending seam (not illustrated). In this manner, all of the yarns 28, 56 of the first yarn wrap 16 are covered by the strip 18 to prevent wear, movement or other damage. As illustrated, the yarns 24, 57 of the right yarn treating head 14 unwind from the spools 26, 55 as the head 14 is rotated in conventional manner. The spools 26, 55 are mounted upon the right and left bobbin mounting means 50, 44 in the manner hereinbefore described.

In the embodiment illustrated, a plurality of four spools 30 and four spools 54 are shown carried by the bobbin table 42 in the left head 12. Similarly, a plurality of four spools 26 and four spools 55 are shown carried by the bobbin table 42 of the right yarn treatment head 14. As illustrated, a total of eight yarns 24, 57 can thus be wrapped at the right yarn treating head 14 and a total of eight yarns 28, 56 can additionally be spiralled at the left yarn treating head 12. Of course, utilizing the same general arrangement, more or fewer yarns 24, 28, 56, 57 can be applied over the hose 22 in a first spiral layer 16 and in a second spiral layer 20. Care should be exercised when applying any desired number of spools 30, 54 and 26, 55 to the respective bobbin table 42 that the apparatus should be dynamically balanced to as great an extent as possible to avoid undue vibration and machine wear.

Figure 5:
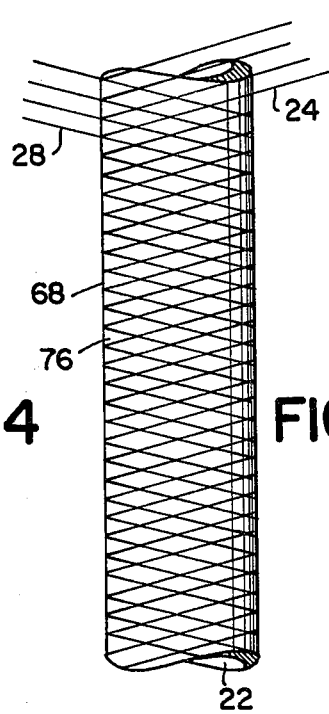
FIG. 5 is a view similar to FIG. 4 showing a portion of a hose having two layers comprisng four yarns each.
Figure 6:
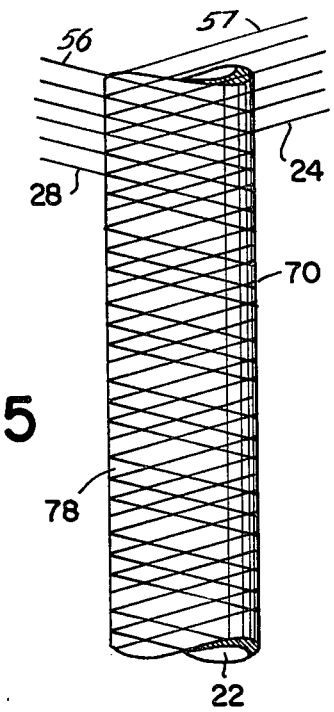
FIG. 6 is a view similar to FIG. 4 showing a portion of a hose having two layers comprising six yarns each.
Figure 7:
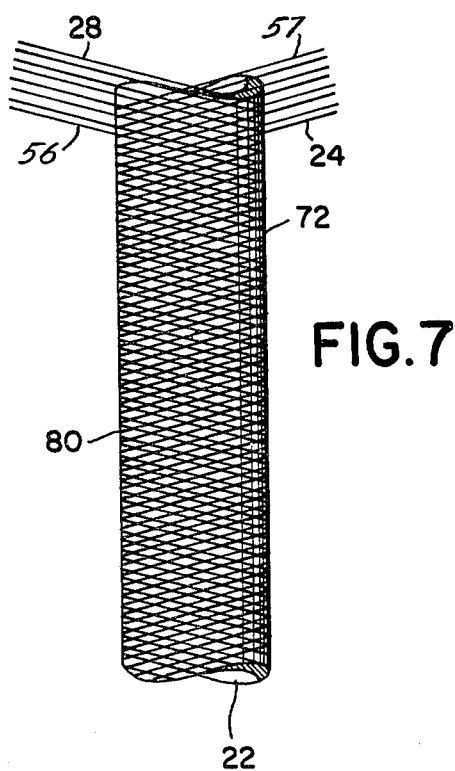
FIG. 7 is a view similar to FIG. 4 showing a portion of a hose having two wraps comprising eight yarns each.

In the embodiment illustrated in FIG. 4 a hose reinforcement 66 comprising two yarns 24, or 57 or combination thereof from the right yarn treatment head 14 and two yarns 28 or 56 or combination thereof from the left yarn treatment head 12 are illustrated. The second or outer spiral layer 74 comprises two yarns 28. In FIG. 5, the outer yarn wrap 76 comprises four yarns 28, 56 or a combination thereof. The inner yarn wrap 68 comprises four yarns 24, 57 or a combination thereof. In FIG. 6, the outer yarn wrap 78 comprises six yarns 28, 56 and the inner yarn wrap 70 comprises also six yarns 24, 57. In FIG. 7, the outer yarn wrap 80 comprises a total of eight individual yarns 28, 56. The inner yarn wrap 72 also comprises a total of eight yarns 24, 57. In this manner, any desired combination of right first yarns 24, 57 and left or second yarns 28, 56 can be applied about a flexible hose 22.

Although I have described the present invention with reference to the particular embodiments herein set forth, it is understood that the present disclosure has been made only by way of example and that numerous changes in the details of construction may be resorted to without departing from the spirit and scope of the invention. Thus, the scope of the invention is not limited by the foregoing specification, but only by the claims annexed hereto.

I claim:

1. A circular wrapping machine of the type comprising a hose inlet end, a wrapped hose outlet end, a wrapping head at the outlet end suitable to apply a reinforcement layer about a flexible hose, comprising in combination a stationary frame;
   a bobbin table rotatable within the frame,
      said bobbin table comprising first and second bobbin carrying surfaces,
      said second bobbin carrying surface being closer to the wrapping head than the first surface,
      said bobbin table being provided with a plurality of openings;
   a plurality of first and second bobbin mounting means being secured respectively to the first and second bobbin carrying surfaces to feed a plurality of first and second yarns from spools mounted on the bobbin mounting means to the reinforcement layer,
      one of said openings being positioned adjacent to each of said first bobbin mounting means whereby first yarns from spools mounted on the first bobbin mounting means will pass longitudinally through the openings toward the wrapping head;
   a first yarn guide positioned in spaced relationship from the first bobbin carrying surface,
      said first yarn guide being adapted to receive first yarns from first spools on the first bobbin mounting means and to guide the first yarns first away from and then toward the said bobbin table openings,
      said first yarn guide being positioned closer to the machine hose inlet than the first spools; and
   a second yarn guide positioned in spaced relationship from the second bobbin carrying surface,
      said second yarn guide being adapted to receive second yarns from second spools on the second bobbin mounting means and to guide the second yarns toward the said wrapping head,
      said second yarn guide being positioned closer to the wrapping head than the second spools; and
   whereby the first yarns feed first in a direction away from the wrapping head and thence toward the wrapping head and the second yarns feed in a direction toward the wrapping head.

2. The machine of claim 1 wherein each respective opening is positioned closer to the center of the bobbin table than its associated bobbin mounting means.

3. The machine of claim 1 wherein the bobbin mounting means secured to one surface of the bobbin table are in registry with the bobbin mounting means secured to the other surface of the bobbin table.

4. The machine of claim 1 wherein at least part of the first yarn guide is positioned to overlie the first spools whereby first yarns from the first spools feed longitudinally to the first yarn guide in a direction away from the wrapping head.

5. The machine of claim 1 wherein the second yarn guide is positioned to overlie the second spools whereby second yarns from the second spools feed longitudinally to the second yarn guide in a direction toward the wrapping head.

6. The machine of claim 4 wherein the second yarn guide is positioned to overlie the second spools whereby second yarns from the second spools feed longitudinally in a direction toward the wrapping head.

7. The method of applying a reinforcement layer about a flexible hose as it travels through a wrapping head comprising the steps of (A) feeding the flexible hose through a bobbin table having an inlet side and an outlet side;
   (B) affixing at least one yarn carrying spool to the inlet side of the bobbin table and feeding a first yarn first in a direction away from the wrapping head and then in a direction towards the wrapping head;
   (C) affixing at least one yarn carrying spool to the outlet side of the bobbin table and feeding a second yarn always in a direction toward the wrapping head;
   (D) feeding the first of the yarns through an opening in the bobbin table when feeding toward the wrapping head; and
   (E) applying both of said yarns about the flexible hose in a reinforcement layer at the wrapping head.

8. The method of claim 7 further comprising the steps of feeding the first yarn to a first yarn guide and utilizing the first yarn guide to guide the first yarn in a direction away from the wrapping head.

9. The method of claim 8 comprising the additional step of feeding both the first and second yarns to a second yarn guide and utilizing the second yarn guide to guide the first and second yarns toward the wrapping head.

* * * * *